United States Patent [19]

Esakov et al.

[11] 4,287,151
[45] Sep. 1, 1981

[54] METHOD AND APPARATUS FOR HIGH SPEED EXTRUSION OF THERMOPLASTIC MATERIALS

[75] Inventors: Michael D. Esakov, Greer; David C. Hudgens, Jr., Lyman; Frederick D. Stringer, Greenville, all of S.C.

[73] Assignee: W. R. Grace & Co., Duncan, S.C.

[21] Appl. No.: 749,861

[22] Filed: Dec. 13, 1976

[51] Int. Cl.³ .............................................. B29F 3/08
[52] U.S. Cl. .................................. 264/560; 264/562; 264/565; 264/569; 264/209.1; 425/71; 425/72 R; 425/326.1
[58] Field of Search ............... 264/95, 89, 209, 178 R, 264/237, 560, 562, 565, 569; 425/71, 72, 326.1, 72 R

[56] References Cited
U.S. PATENT DOCUMENTS

| 2,987,767 | 6/1961 | Berry et al. | 264/95 |
| 3,084,386 | 4/1963 | Gerow | 264/209 |
| 3,089,187 | 5/1963 | Wolfe | 264/209 |
| 3,090,998 | 5/1963 | Heisterkamp et al. | 264/95 |
| 3,427,375 | 2/1969 | Turner | 264/209 |
| 3,522,337 | 7/1970 | Ball | 425/72 |
| 3,819,776 | 6/1974 | Robinson et al. | 264/209 |
| 3,857,917 | 12/1974 | Reade | 264/209 |

Primary Examiner—Jeffery R. Thurlow
Attorney, Agent, or Firm—John J. Toney; William D. Lee, Jr.

[57] ABSTRACT

In the process of extruding tubular thermoplastic film or tape, the production rate can be improved by using a smooth support plug to stabilize and shape the extrudate after it has been cooled and at least partially solidified. A principal function of the support plug is to assist in supporting the long slender column of partially solidified extrudate which is above the plug. The result is a significant increase in the output of the extrusion process.

17 Claims, 2 Drawing Figures

METHOD AND APPARATUS FOR HIGH SPEED EXTRUSION OF THERMOPLASTIC MATERIALS

FIELD OF THE INVENTION

This invention relates to a method and apparatus for high speed extrusion of thermoplastic materials, particularly polyolefin polymers and copolymers. Specifically, the invention relates to a method of stabilizing and shaping a downwardly extruded tubular melt so that thermoplastic tubing which is essentially unexpanded radially may be produced at relatively high speeds.

BACKGROUND OF THE INVENTION

In the prior art one method of making thermoplastic film is to extrude the thermoplastic material in the shape of a tube with relatively thick walls, cool and flatten the tube, and subsequently heat and expand the tubing with internal air pressure to stretch the film to the desired thinness and/or orient the film. The relatively thick-walled tubing in the unexpanded condition is often referred to as "tape" in the art.

When a thermoplastic material leaves the extruder die it is in a molten and non-self-supporting condition. When attempts are made to increase the speed of extrusion, the molten extrudate will neck down unpredictably and stretch non-uniformly under its own weight before it solidifies. One prior art method used to overcome this problem is to employ a coaxially mounted spreader and former with a roughened surface over which the non-self-supporting tubular film is passed in contact therewith. In combination with the former an after baffle is used having the same diameter as the former in order to assure that the pulling force around all sides of the tubular extrudate is the same. Such a method and apparatus is described in U.S. Pat. No. 3,084,386 which issued to M. R. Gerow on Apr. 9, 1963. However, it has been found that contact with a spreader or former prior to solidification of the interior wall of the tubular extrudate will result in undesirable irregularities in the interior surface of the tube. Accordingly, it is one object of the present invention to provide a tubular substrate with a substantially uniform, unscuffed interior surface.

Another object of the subject invention is to provide a process and apparatus which will allow high speed production of a tubular extrudate.

Still another object of the subject invention is to provide a process and apparatus wherein the extrudate remains stable as it is taken from the extrusion die.

These and other objects of the subject invention will become apparent to those skilled in the art from the following Summary of the Invention, Drawings, and Detailed Description of the Invention.

SUMMARY OF THE INVENTION

In one aspect, the subject invention is an improved process for extruding thermoplastic materials in tubular form without expanding the tubular extrudate to a diameter greater than that of the extruder die which comprises the steps of: disposing support means within said extruded tube, said support means being of larger diameter than said tube; and, cooling and solidifying the inner wall of said tube prior to contact between said wall and said support means whereby the contact of said support means and tube wall causes unsolidified portion of the extrudate upstream from said support means to be stable at high extrusion rates. For maximum extrusion rates the exterior of the extrudate should be cooled and solidified in conjunction with the inner wall of the tube thus providing an increased measure of stability.

In another aspect, the present invention is an apparatus for the high speed production of tubular thermoplastic extrudate comprising: a circular extrusion die; means for delivering molten thermoplastic material to the die; interior cooling means located below said die for solidifying the interior wall of said extrudate while not in direct contact therewith; support means located below said interior cooling means, said support means being in contact with the inner periphery of said tubular extrudate thereby causing the solidified extrudate upstream of said support means to be stable under high speed operation. Again, for maximum extrusion rates, exterior cooling means such as a water ring which applies a film of water to the outside surface of the extrudate can be employed in conjunction with the interior cooling means to cool the extrudate as rapidly as possible.

DESCRIPTION OF THE DRAWINGS

In the drawings which are appended hereto and made a part of this disclosure.

DETAILED DESCRIPTION OF THE INVENTION

Figures 1, 2:
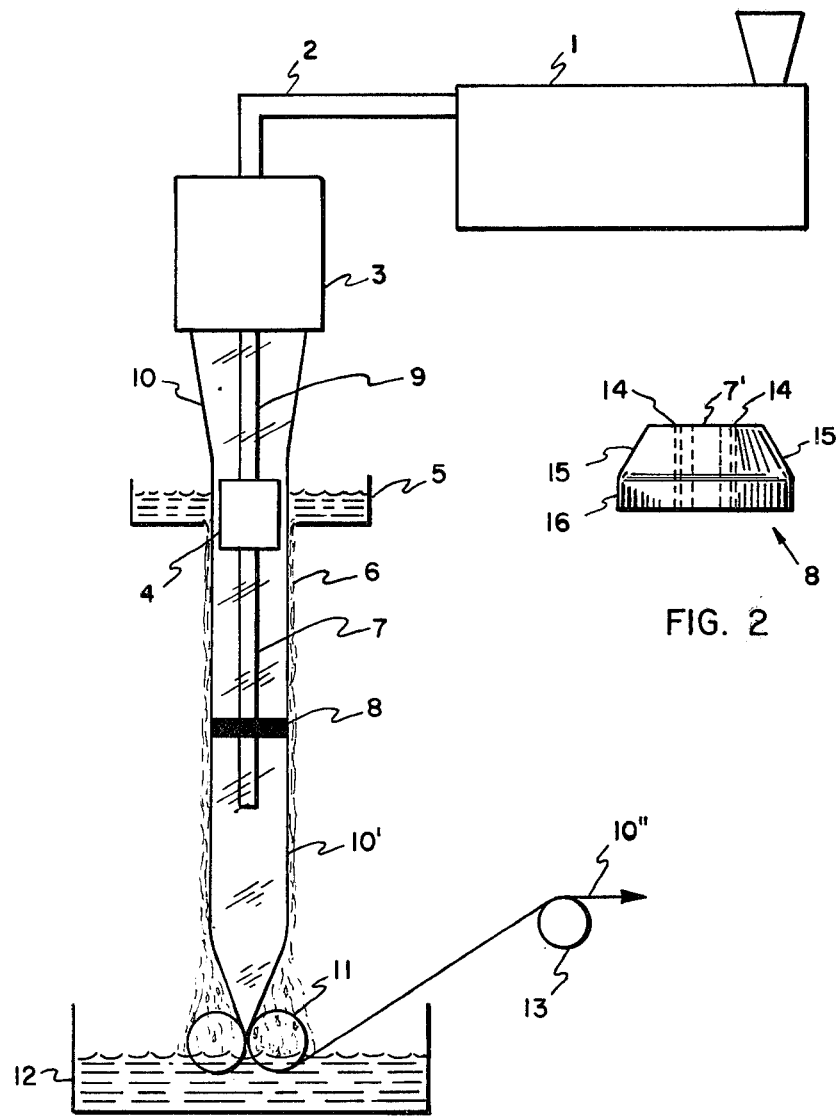
FIG. 1 is a schematic representation of the process and apparatus of the subject invention; and, FIG. 2 is an elevation view of a preferred embodiment of the support plug of the subject invention.

Referring now to FIG. 1 of the drawings, extruder 1 is shown connected to circular extrusion die 3 by melt supply tube 2. Located below extrusion die 3 is interior cooling means or air mandrel 4 which is supported by air supply duct or pipe 9 which is coaxially positioned with circular die 3.

The porous mandrel 4 is preferably in the shape of a right circular cylinder with beveled leading and trailing edges. The outer wall of the cylinder is made from a porous metal such as sintered bronze or stainless steel with sufficient porosity so that a gas such as air will flow readily and uniformly out from the radial surface of the cylinder. The mandrel is closed at its lower end with a closure that does not permit air to flow in an axial direction and at the upper end the cylinder is also closed except for the inlet duct from air supply pipe 9. No axial flow upwardly is permitted. The interior of the mandrel is hollow and unobstructed so that air may flow uniformly outwardly through the radial, porous surface.

Mounting stem 7 which is coaxially aligned with mandrel 4 is attached to the bottom closure of the mandrel and extends downwardly to contact the support means or plug 8 which is a smooth disc having a diameter larger than that of the extrudate issuing from circular die 3. Support plug 8 has vertical holes through it so that the air pressure both above the plug and below the plug will be essentially the same. The support plug may formed of any suitable material, preferably metal, but plastic materials could also be used.

Below support plug 8 are located pinch rolls 11 which collapse the solidified tubing 10'.

As the melt parison or tubular extrudate 10 is formed downwardly from die 3 it encloses air mandrel 4. At approximately this point exterior cooling means or water ring 5 encircles the tubular extrudate 10. The ring or iris 5 is in the shape of a circular tray with an opening therethrough with a diameter slightly larger than that of the tubular extrudate 10. A constant flow of water is fed to the water ring 5 and the overflow from the water ring provides an annular film of water on the outer surface of extrudate 10 which falls downwardly around the entire outer periphery of the extrudate 10 thereby cooling same. This film of water is collected by receptacle 12. Water is the preferred flowable cooling medium as its heat capacity and heat transfer characteristics are such as to cool the extrudate more rapidly than would a chilled gas. As an alternate to the water ring, a fine spray of cooled water could be directed against the exterior surface of the tubing. In combination, the air mandrel and water ring serve as the means to cool and solidify the extrudate. In some instances, depending upon the polymer being extruded and upon the extrudate wall thickness, either the interior or exterior cooling could be eliminated as one cooling means alone would be sufficient to solidify the interior tube wall before reaching the support plug.

Once the extrudate 10' which is solidified is collapsed by rolls 12 it is then wound up by being fed across guide roller 13 to a wind-up station. In this flattened condition the tubing is referred to as tape 10".

In operation as the extrudate 10 envelopes the air mandrel 4 it is essential that sufficient air pressure or air flow be maintained so that the extrudate does not contact the mandrel. The flow of air cools and solidifies the inside surface of the extrudate 10 and keeps the surface from coming into contact with the mandrel 4. Should the interior surface of the tubular extrudate 10 come in contact with either the mandrel or the support plug 8 prior to solidification of the tube wall, irregularities in the interior wall surface would occur along with scratching and scuffing of the surface. Also, there is a possibility that some of the molten material might be deposed on the mandrel.

At the point that the film does contact the support means or support plug 8 the interior wall surface is solidified and the plug 8 is of slightly larger diameter than the interior diameter of the tubular substrate 10 and causes a slight drag on the film at that point. This drag or the friction between the interior extrudate wall and the plug serves to support the partially molten column of extrudate above the plug and stabilize the column. In the process of extruding polypropylene, for example, it has been found that the best results are achieved by locating the support plug 8 approximately midway between the air mandrel 4 and the collapsing rollers 11 when the extrusion die has an interior diameter of approximately 8 inches and the extrudate has a wall thickness of about 15 mils. In this example, the diameter of the air mandrel 4 should be about 5 inches and its length should be 6 inches or more; and, the diameter of the support plug should be slightly greater than 5 inches (approximately 0.020" greater) and its height should be about 1 inch. The radial surface of the plug is preferably polished smooth with rounded edges and, if desired, the radial surface can be coated with a suitable friction reducing material such as one of the fluorocarbon resins sold under the Teflon trademark of the du Pont Company. It is to be understood, of course, that depending on the specific thermoplastic polymer being extruded and the diameter and thickness of the tubing being extruded that some empirical adjustments will be necessary. However, these are all within the skill of the art of those familiar with extrusion technology.

Turning now to FIG. 2, an elevation view of a preferred support plug 8 is shown. The plug 8 has a lower section of right circular cylinder shape having a radial surface 16 which is in contact with the extrudate and should be polished smooth as stated in the foregoing paragraph. The radial surface 16 is preferably about 1 inch high. Above the lower cylindrical section is a frusto-conical section having guide surface 15. This guide surface which is tapered allows the tubular extrudate to be readily threaded over the plug during start-up of a process when the leading portion of the extrudate is initially guided downwardly around the mandrel and over and in contact with the support plug. The tapered surface, in effect, acts as a "shoe horn" and once the process is operating continuously only radial surface 16 is in contact with the extrudate. Air holes 14 are also shown in FIG. 2 in dotted lines as is also orifice 7' for receiving mounting stem 7. (See FIG. 1) A suitable locking pin (not shown) or similar fastening device can be used to secure plug 8 to mounting stem 7.

Particularly suitable polymers for extrusion are the polyolefins, notably polyethylene and polypropylene and copolymers thereof such as ethylene-vinyl acetate copolymer and ethylene-propylene copolymer. The subject invention finds especially useful application where the wall thickness of the tubing is to be 15 mils or greater. In the instance of extruding polypropylene, extrusion rates in the neighborhood of 150 to 200 pounds per hour could be achieved without the combination of the air mandrel and support plug of the subject invention whereas with the combination of this invention extrusion rates in excess of 400 pounds per hour have been obtained.

The flattened tape produced by the process of this invention is typically passed through pinch rollers, heated in a hot water bath or by a hot air oven, and expanded by inflating the tube with high pressure air in what is well known in the art as the "trapped bubble technique." By this means a thin thermoplastic films of desired thickness and width can be obtained.

Having thus described our invention, we claim:

1. In the process of extruding thermoplastic materials in tubular form without expanding the tubular extrudate radially to a diameter greater than that of the extruder die the improvement which comprises:
   (a) disposing support means within said extruded tube, said support means being of larger diameter than said tube at the point of its contact therewith and having a passageway therethrough to equalize air pressure above and below said support means; and,
   (b) cooling and solidifying the inner wall of said tube prior to contact between said wall and said support means whereby the contact of said support means and tube wall causes the unsolidified extrudate upstream from said support means to be stable at high extrusion rates.

2. The improved process of claim 1 wherein the step of cooling and solidifying is performed by:
   i. positioning a mandrel within said tubular extrudate upstream from said support means; and,
   ii. delivering a gas to said mandrel whereby the force of said gas as it is emitted from the radial surface of said mandrel prevents contact between said extrudate and mandrel.

3. The process of claim 1 wherein the cooling step is performed by providing a flowable cooling medium around the exterior said extrudate.

4. The improved process of claim 1 including the step of collapsing said tubing after its contact with said support means.

5. The method of claim 2 wherein said gas is air.

6. The method of claim 3 wherein said flowable medium is water.

7. A method for the high speed production of tubular thermoplastic extrudate comprising the steps of:
   (a) providing a circular extrusion die,
   (b) providing an air mandrel having a porous outer surface through which air can be delivered, said mandrel being of smaller diameter than tubular melt extruded from said circular die, and said mandrel being supported below said extrusion die by air delivery means;
   (c) providing a support plug of diameter greater than the diameter of the tubular melt at the point of the plug's contact with the melt but less than the diameter of the extrusion die, said plug being located below said air mandrel and having an air pressure equalization passageway therethrough to equalize pressure above and below said support plug;
   (d) extruding a tubular thermoplastic extrudate downwardly from said extrusion die;
   (e) passing said tubular extrudate around but not in contact with said mandrel;
   (f) delivering air to said porous mandrel so that the emission of air from the mandrel's surface prevents contact between the extrudate and mandrel, said air cooling and solidifying the inner wall of said extrudate; and,
   (g) passing said extrudate over and around and in contact with said support plug, the contact between said plug and extrude causing the unsolidified extrudate upstream from said extrudate to be stable at high production rates.

8. The method of claim 7 including the step of collapsing said tubular substrate after it leaves the support plug.

9. The method of claim 7 including the step of providing a cooling film of water around said extrudate, said water being applied to the exterior surface of said extrudate at approximately the same point that said air mandrel delivers air to the interior surface of said extrudate.

10. Apparatus for the high speed production of tubular thermoplastic extrudate comprising:
    (a) a circular extrusion die;
    (b) means for delivering molten thermoplastic material to said die;
    (c) interior cooling means located below said die for solidifying the interior wall of said extrudate while not in direct contact therewith, said interior cooling means having a diameter smaller than the tubular extrudate; and,
    (d) support means located below said interior cooling means and having an air pressure equalization passageway therethrough, said support means having a diameter greater than that of the tubular extrudate at the point of contact therewith but less than the diameter of the extrusion die and being in contact with the inner periphery of said tubular extrudate thereby causing the unsolidified extrudate upstream of said support means to be stable under high speed operation.

11. The apparatus of claim 10 including means to collapse the tubular extrudate located below said support means.

12. The apparatus of claim 10 including exterior cooling means to cool the exterior surface of said tubular extrudate.

13. The apparatus of claim 10 wherein said interior cooling means is a porous air mandrel with means for delivering a continuous supply of air thereto.

14. The apparatus of claim 12 wherein said exterior cooling means is a cooling ring which encircles said extrudate providing a film of water to cool said extrudate.

15. Apparatus for high speed production of tubular thermoplastic extrudate comprising:
    (a) an extruder for producing a thermoplastic melt;
    (b) a circular extrusion die fed by said extruder for extruding a tubular extrudate downwardly;
    (c) a porous air mandrel having a diameter smaller than the diameter of said extrudate;
    (d) mandrel air supply means coaxially mounted to said circular extrusion die and extending downwardly therefrom to support said mandrel; and,
    (e) support plug means mounted coaxilly below said mandrel, said support plug having an air pressure equalization passageway therethrough and a diameter larger than said extrudate but less than the diameter of the extrusion die whereby contact between said plug and extrudate stabilizes the extrudate upstream from said plug.

16. The apparatus of claim 15 including exterior cooling means to cool the outer surface of the extrudate.

17. The apparatus of claim 15 including means to collapse and flatten said extrudate located below said plug.

* * * * *